3,262,896
VINYL HALIDE RESINS STABILIZED WITH MIXTURES OF ZINC SALTS AND POTASSIUM SALTS OF MONOCARBOXYLIC ACIDS

Bernard Ackerman, Edison, N.J., assignor to Carlisle Chemical Works, Inc., Reading, Ohio, a corporation of Ohio
No Drawing. Filed July 6, 1965, Ser. No. 469,913
5 Claims. (Cl. 260—23)

This application is a continuation-in-part of my application Serial No. 81,707, filed January 10, 1961, now abandoned.

The invention relates to stabilized haloethylene polymer compositions.

It is well known that halogen-containing resins, particularly vinyl chloride and vinylidene chloride resins, or resins formed by joint polymerization of vinyl chloride or vinylidene chloride with each other or with other copolymerizable unsaturated compounds, are liable to discoloration and deterioration when exposed to elevated temperatures such as those employed in calendering, extruding, molding and other processing operations. Such copolymerizable unsaturated compounds are, for instance, vinyl acetate, dialkyl fumarate or maleate, styrene, and others.

A great number of stabilizers has been proposed to prevent such discoloration, and a widely used group of such stabilizers is represented by metal salts of organic acids alone or in various combinations with each other and with other types of stabilizers.

One of the metals most frequently employed in such metal salts of organic acids and metal soaps is cadmium, preferably in combination with barium. However, cadmium has certain disadvantages; the salts are expensive, toxic, and are sensitive to sulfur so as to form sulfide stains when plastics stabilized therewith are used in areas of high concentration of volatile sulfur compounds.

Zinc is closely related to cadmium and is free of all the drawbacks recited above. The salts and soaps are cheap, they are non-toxic, and they do not form sulfide stains. It is, therefore, obvious that zinc has been proposed very early as a substitute for cadmium. Unfortunately, zinc stabilizers have a very annoying property of their own; already in small amounts, they will blacken and char the resin to be stabilized within a very short time.

About twenty years ago, it was observed that the sudden blackening of resins stabilized with zinc stearate could be delayed when the zinc stearate was used together with stearates of the alkali metals or alkaline earth metals. It was found that by far the best results were obtained with mixtures of zinc stearate and barium stearate, i.e. with a stabilizer mixture corresponding to the well known barium-cadmium synergism in which the cadmium was replaced by zinc.

However, in commercial operation, it was soon found that also the zinc-barium combination was, in most cases, not a satisfactory solution of the problem because the barium component had to be used in relatively large amounts. Though such large amounts delay the blackening sufficiently, they impart to the resin what the resin chemist calls "early color." This means that the clear resin shows quite early an undesired discoloration and yellowing. In practical terms, this means that in calendering and extrusion operations, the resin must not be exposed for any extended periods of time to high temperatures which, for all practical purposes, excludes the use of scrap resins which must be repeatedly reworked and exposed to high temperatures. Therefore, the requirement of employing relatively large amounts of barium has curtailed the use of barium-zinc soap combinations on any larger scale.

Whenever alkali metal soaps have been proposed as stabilizers, essentially the sodium soaps, e.g. sodium stearate, were used. When used in combination with zinc soaps, sodium soaps have not much influence on the overall performance and the burn-effect, and they do not present any worthwhile advantages over the barium soaps.

By accident, I have found that potassium soaps, which are hardly ever being used as stabilizers, have a particular synergistic action with zinc soaps which goes far beyond any such synergism shown by barium or sodium soaps. In such zinc-potassium combinations, only about one-half as much zinc and one-fifth to one-tenth as much potassium are needed as in the zinc-barium soap combinations. The main advantages of such lower amounts are lower cost, better film clarity, greater ease of solution in the solvents conventionally used to incorporate the stabilizer, and lower viscosity of the stabilizer system.

Though the stabilizing efficiency proper of a metal salt or soap combination is essentially governed by the metal component, the acid component controls other required properties of a stabilizer such as compatibility and other aspects. Among other such properties required from a good stabilizer system are, e.g. avoidance of "plate-out" and over-lubrication. "Plate-out" is a term designating build-up of resin compositions on calender rolls and thereby interfering with the processing of subsequent batches. It is usually measured by blending a red pigment with a stabilized resin composition to be tested and milling the blend. The pigment goes into the resin and colors it a dark red. Resin left on the rolls due to "plate-out" is red and will then color the next batch processed on the equipment. The intensity of red color in such next batch, called "clean-up" batch, is used as a measure of the "plate-out" of the first treated batch.

Overlubrication prevents good resin banding in many calendering and extrusion applications.

The art has learned by long experience that stearates and soaps of similar long-chain unsubstituted fatty acids produce both "plate-out" and "over-lubrication." It is for this reason that I prefer to use zinc and potassium salts of fatty acids containing 6 to 12 carbon atoms, such as ethylhexoic, caprylic, capric, and lauric acid, or such salts of benzoic acid or substituted benozic acids, as recited, e.g. in patent No. 2,935,491. In the case of highly branched aliphatic carboxylic acids, Zn and K salts of such acids having less than 6 C atoms, e.g. neopentanoic acid, are also compatible with the resin. However, it should be understood that the synergistic stabilizing action proper of the Zn-K combination is independent of the nature of the cation and, disregarding any side effects, will be observed whenever said combination is used as the metal moiety of an organic salt stabilizer.

The ratio of Zn:K in such synergistic combination is in the range from 10:1 to 10:10, preferably 10:3 to 10:8. I use the combination as stabilizer in such amounts that 0.01 to 3 percent of Zn by weight of the stabilizer resin composition are employed. In most cases, Zn amounts of less than 0.1 and K amounts of less than 0.05 will be sufficient whereby the widely varying zinc sensitivities of different resins must be taken into account. However, high concentrations up to 3% Zn are well tolerated in highly filled polyvinyl chloride plastisols.

The salts may be either neutral or basic salts. Though it is convenient to use zinc and potassium salts of the same acid, mixtures may also be used which contain different zinc and potassium salts.

Like other metal salt stabilizers, the stabilizer of the invention, though being effective to a certain extent also when used alone, will be employed generally with other heat and particularly light stabilizers, and other conventional additives, such as plasticizers and pigments, may be incorporated in the resins. Suitable additional stabilizers are, for instance, epoxides, polyhydric alcohols, and/or alkyl substituted phenols and salts thereof.

Other conventional additional stabilizers are organic phosphites. A great number of such phosphites are known to be useful in stabilizer combinations, particularly trialkyl, trialkylene, triaryl, and mixed alkyl aryl phosphites. Suitable phosphites of these groups are disclosed, for instance, in Patents Nos. 2,456,231, 2,728,789, 2,739,952, and in British Patents Nos. 803,081 and 803,082.

Another useful group of phosphites are the pentaerythrityl phosphites described in the various patents of I. Hechenbleikner et al., such as Nos. 2,834,798, 2,841,606, 2,847,443, particularly the octaphenyl pentaerythrityl tetraphosphite and the diphenyl pentaerythrityl diphosphite. The phosphites are employed in such amounts that about 0.1 to 5 percent of phosphorus by weight of the halogen-containing resin are incorporated in the resin blend.

Finally, my novel stabilizer composition is also useful in combination with dicyandiamide, melamine, and similar compounds for the stabilization of vinyl chloride floor tiles which have been made with iron-containing asbestos.

The stabilizer system of the invention is of particular importance for vinyl chloride and vinylidene chloride polymers and copolymers which contain vinyl chloride or vinylidene chloride in amounts from 50 to 100 percent of the polymer. Suitable copolymers and other halogen-containing resins are recited, for instance in Patent No. 2,745,819.

The invention is further illustrated by the following examples where Example 1 is given to show that the specific effect of potassium is present, also in otherwise impractical formulations where no other stabilizer is used. The other examples illustrate formulations which have been successfully employed in practical applications.

All parts are given by weight unless indicated otherwise.

Example 1

Several polyvinyl chloride resin compositions were prepared, each containing 100 parts of Geon 101–EP (vinyl chloride polymer), 50 parts of dioctyl phthalate, and 0.5 part of stearic acid as lubricant.

Said mixtures were blended with:

(a) 0.161 part of zinc laurate
(b) 0.161 part of zinc laurate, and 0.029 part of sodium laurate
(c) 0.161 part of zinc laurate, 0.031 part of potassium laurate fused on a 2-roll mill at 320° F. and formed into continuous films. The total time of milling was 5 minutes.

The blend (a) discolored already on the mill after 3½ minutes and was not further tested.

From the other two films, pieces about 1 inch x ½ inch were cut and baked in an oven at 300° F. Pieces were removed from the oven every five minutes.

The formulation (b) remained clear for less than 10 minutes whereas formulation (c) remained colorless for almost 15 minutes. The substitution of equimolar amounts of potassium for sodium in the stabilizer therefore resulted in an extension of the stabilization time by more than 50 percent. Such prolongation of heat stability is frequently decisive and makes it possible to process scrap resin together with virgin resin when repeated or more severe heating cycles are required.

Example 2

A mixture of the following composition:

| | Parts |
|---|---|
| Polyvinyl chloride resin | 100.00 |
| Dioctyl phthalate | 45.00 |
| Epoxidized soya oil | 5.00 |
| Triphenyl phosphite | 0.50 |
| Alkylated phenol | 0.10 |
| Stearic acid | 0.50 |
| Zinc as the 2-ethylhexoate salt | 0.025 |
| Potassium as potassium 2-ethylhexoate | 0.005 | was fused on a 2-roll mill at 320° F. and formed into a continuous film. The total time of milling was 5 minutes. Eight pieces about 2 inches square were cut from this film and baked in an oven at 350° F. One piece was removed from the oven every 15 minutes. Yellowing did not occur until 60 minutes and blackening took place after 105 minutes.

If the tests were repeated with a similar resin composition but without the potassium 2-ethylhexoate, a slight yellow coloration appeared as early as 15 minutes. At 30 minutes the film was distinctly yellow and after 45 minutes it was black. This result was hardly improved when 0.005 part of sodium was added as sodium 2-ethylhexoate. Yellowing of the film occurred after 45 minutes and blackening at 60 minutes.

If instead of the triphenyl phosphite, dodecyl phenyl phosphite in an amount supplying the same amount of phosphorus was used, the film showed no yellowing until 75 minutes and no blackening until 120 minutes baking time.

When no phosphite at all was used, yellowing appeared at 30 minutes. The film was brown after 45 minutes and black after 60 minutes.

Example 3

A blend as in Example 2 was used with the sole difference that zinc isodecanoate and potassium isodecanoate were used (0.025 part of Zn and 0.01 part of potassium). When processed as set forth in Example 2, no pronounced yellowing occurred until 75 minutes baking time and no blackening until 120 minutes.

If instead of the potassium isodecanoate, barium isodecanoate was used, the same stabilizing effect could be achieved only when 0.075 part of barium was incorporated.

Example 4

The following blend was employed:

| | Parts |
|---|---|
| Polyvinyl chloride | 100.00 |
| Dioctyl phthalate | 45.00 |
| Epoxidized soybean oil | 5.00 |
| Tributyl phosphite | 0.50 |
| Nonyl phenol | 0.10 |
| Stearic acid | 0.50 |
| Zinc as zinc laurate | 0.025 |
| Potassium as potassium laurate | 0.005 |

When processed as described in Example 2, no yellowing of the film occurred until 75 minutes baking time. The yellowing increased through 120 minutes with no blackening at all.

Example 5

In this example, a polyvinyl chloride copolymer was used.

| | Parts |
|---|---|
| Polyvinyl chloride (85%)—polyvinyl acetate (15%) blend | 100.00 |
| Dioctyl phthalate | 45.00 |
| Epoxidized soya oil | 5.00 |
| Triphenyl phosphite | 0.50 |
| Nonyl phenol | 0.10 |
| Stearic acid | 0.50 |
| Zinc decanoate—zinc equal | 0.025 |
| Potassium decanoate—potassium equal | 0.01 |

This mixture was processed as described in Example 2 with the sole difference that the milling temperature was 300° F. The film turned a pale yellow on milling and could be baked in the oven for 30 minutes before turning black.

If the potassium soap was omitted, the film turned a deep yellow within 5 minutes, then amber and finally black.

*Example 6*

A mixture of the composition

|  | Parts |
|---|---|
| Polyvinyl chloride | 100.00 |
| Triphenyl phosphite | 0.50 |
| Zinc ricinoleate—zinc equal | 0.50 |
| Potassium butyl maleate—potassium equal | 0.20 |
| p-Tert-butyl phenol | 0.10 | was treated as described in Example 2.

The obtained film was baked for 45 minutes before appreciable color developed. An unstabilized mixture containing all components but the potassium and zinc salts developed color within 15 minutes.

*Example 7*

A mixture similar to that in Example 2 was used except that 100 parts of chlorinated polyethylene replaced the polyvinyl chloride. Discoloration did not occur until 60 minutes of heating. A control film with no potassium and zinc salts discolored almost immediately.

I claim:

1. A heat resistant plastic composition including as a major constituent a haloethylene polymer and containing as heat stabilizers a zinc salt and a potassium salt of an organic monocarboxylic acid selected from the group consisting of fatty acids having 6 to 12 carbon atoms, branched aliphatic acids having 5 to 12 carbon atoms, benzoic acid, and substituted benzoic acids.

2. A composition as claimed in claim 1 wherein the resin is a polymer containing a plurality of vinyl chloride units.

3. A composition as claimed in claim 1 wherein the resin is a conjoint polymer of vinyl chloride with another polymerizable compound.

4. A composition as claimed in claim 1 wherein zinc is present in an amount of 0.01 to 0.5 percent by weight of the plastic composition and wherein the weight ratio of zinc to potassium is from 10:1 to 10:10.

5. A heat and light resistant plastic composition comprising a halogen-containing resin, a heat stabilizer in an amount of about 0.01 to 3 percent by weight of the plastic composition, said heat stabilizer comprising a zinc salt and a potassium salt as claimed in claim 1, the weight ratio of zinc to potassium being from 10:1 to 10:10, and at least one auxiliary stabilizer selected from the group consisting of organic phosphites, polyols, and 1,2-epoxy compounds.

References Cited by the Examiner

UNITED STATES PATENTS

| 2,181,478 | 11/1939 | Fligor | 260—45.85 |
| 2,364,410 | 12/1944 | Whittaker | 260—45.85 |
| 2,446,976 | 8/1948 | Cousins | 260—45.75 |
| 2,921,917 | 1/1960 | Longman | 260—45.75 |

LEON J. BERCOVITZ, *Primary Examiner.*

R. A. WHITE, *Assistant Examiner.*